United States Patent Office 3,440,765
Patented Apr. 29, 1969

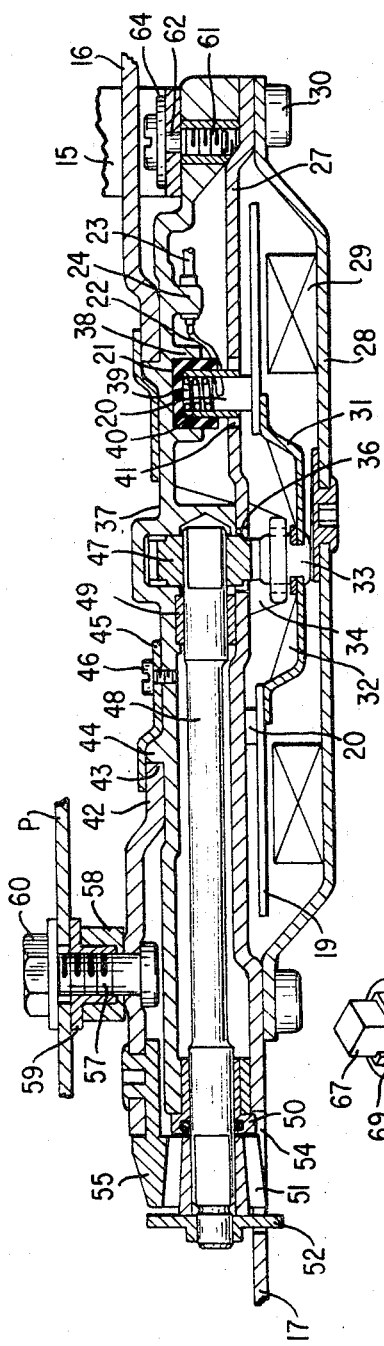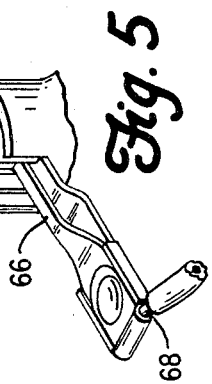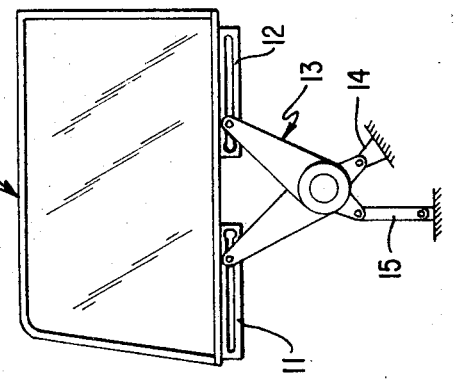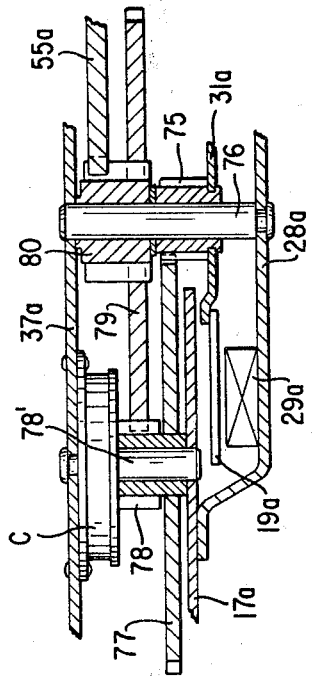

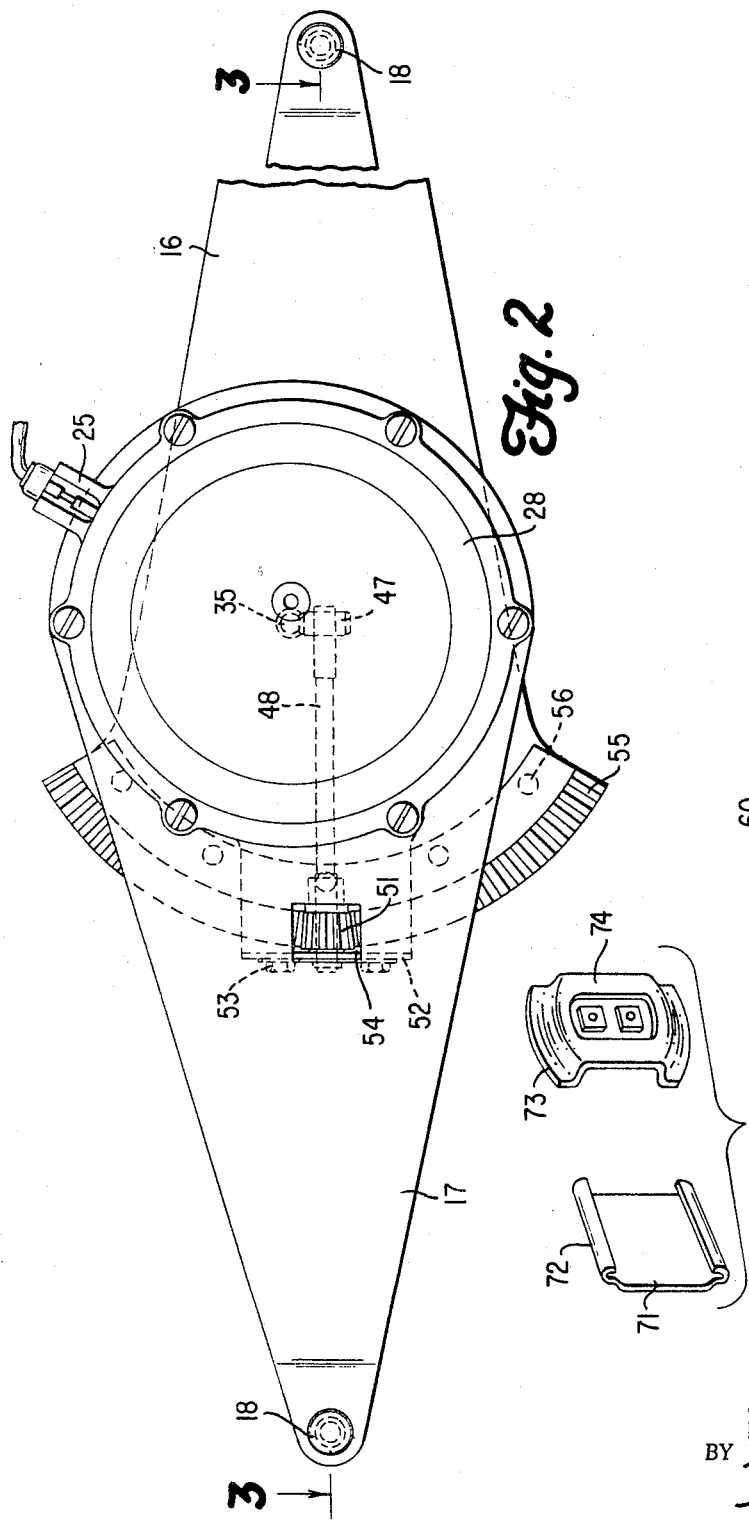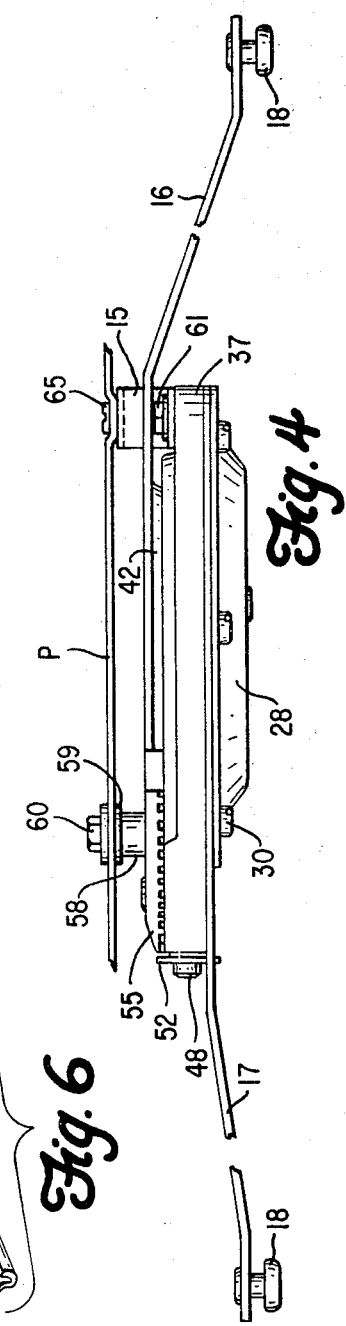

3,440,765
WINDOW ACTUATOR
Rudolph Eskra, Lambertville, Mich., and James M. Cook, Sylvania, Ohio, assignors to Dura Corporation, Oak Park, Mich., a corporation of Michigan
Filed Oct. 23, 1965, Ser. No. 503,579
Int. Cl. E05f 15/08, 15/16
U.S. Cl. 49—349   3 Claims

ABSTRACT OF THE DISCLOSURE

An actuator for a window panel has a small reversible electric motor which is operatively connected through transmission means to a pair of arms having a common axis and rockable in opposite directions. The ends of the arms are slideably connected to linear tracks on an edge of the window panel so that responsive to the direction of rotation of the electric motor the window panel is shifted in one direction or the other.

---

This invention relates to a power operated actuator for automotive vehicles particularly useful for the actuation of windows, vanes, tailgates, doors and the like.

The compact actuator of this invention is of importance in applications where restrictive space limitations exist and where the actuator may be concealed for example in a vehicle door. The actuator is self contained and reliable in operation requiring little if any maintenance. Not only is the cost of the actuator relatively low on a quantity production basis but is capable of high performance characteristics. The power means is in the form of a very small electric motor producing a high torque and operating by low voltage.

An object is to produce a new and improved actuator in which the parts are compacted in exceedingly small space to occupy as little area as possible particularly in depth dimension and in which the electric motor is operatively connected to the driven parts in a novel and efficient manner.

Another object is to produce a simple and efficient motor driven actuator for vehicle parts, such as windows, in which a pair of operating arms are actuated by gear means in a unique manner, the actuator affording a unitary assembly adapted to be readily installed in position of use.

A further object is to produce an actuator particularly useful in concealed restrictive locations having in combination an electric motor having a disk-type armature and a gear drive assembly forming a relatively flat thin self-contained unit.

Other objects and advantages will hereinafter appear and, for purposes of illustration but not of limitation, embodiments of the invention are shown in the accompanying drawings, in which:

FIGURE 1 is a schematic view of an actuator in accordance with this invention connected to operate a window panel;

FIGURE 2 is a plan view of an actuator for vehicle window operation;

FIGURE 3 is a longitudinal sectional view substantially on the line 3—3 of FIGURE 2, showing the connections with an inner door panel;

FIGURE 4 is a side elevation of the actuator;

FIGURE 5 is a perspective view of an alternate form of a spring biased brush assembly;

FIGURE 6 is a composite perspective view of the parts constituting an alternate form of connection between the strap and the actuator;

FIGURE 7 is a fragmentary sectional view of an alternate gear connection between the motor and the operating arms.

FIGURE 1 of the drawings is schematic in illustrating the manner in which the regulator mechanism is operatively associated with a vehicle window panel. In this connection 10 represents a framed window panel, from which depends a pair of laterally spaced horizontally extending guide channels 11 and 12. The guide channels 11 and 12 receive roller studs carried respectively by the free ends of arms forming part of a regulator mechanism 13. In this connection one of the regulator arms is pivotally anchored at 14 to a stationary bracket which conveniently might be a door panel. The other regulator arm is swingably connected to a suitable support by a link or strap 15. Relative rocking movement of the regulator arms of the mechanism 13 away from a horizontal position causes upward or raising movement of the window panel 10 and movement of the arms downwardly from the position shown in FIGURE 1 operates to lower the window panel. As will hereinafter appear, a power drive is closely associated with and forms a part of the regulator mechanism 13. The driving unit is in the form of an electric motor which is extremely small and occupies a minimum of space, such that the entire assembly may be placed within the door of an automotive vehicle.

As shown on the drawings, the regulator mechanism 13 consists of regulator arms 16 and 17, and on the outer ends of the arms are studs 18, which ride respectively in the horizontal guide channels 11 and 12. The operating motor for the regulator mechanism is disposed at one side and consists of a disk-shaped armature against which bear a pair of brushes 20. For each brush 20 a coil spring urges it into engagement with the armature 19 and leading from the brushes are electric wires 22 which are joined as a cable 23 supported by a suitable insulated bracket 24. The cable 23 extends to a receptacle 25 (FIGURE 2) to receive a suitable connector for delivering electric current to the motor 26. As shown, each of the regulator arms is in plan view generally triangular in shape and the larger part of the arm 17 may be termed a plate portion 27 which, as shown on FIGURE 3, is slightly dished. Bearing against the plate portion 27 of the arm 17 is an outwardly dished cover plate 28, which on the inside contains magnet means 29, constituting a permanent magnet in ring form. The cover plate 28 also serves to form a flux path with the regulator plate portion 27.

The armature 19 is extremely thin and may be of the order of 1/32 of an inch in thickness. It is described in detail in copending application Serial No. 288,152 filed June 17, 1963, and owned by the assignee of this invention. The theory of operation of the motor is described in detail in the above mentioned copending application and the general theory of operation is well understood by those skilled in the electrical motor art. The motor armature 19 comprises a disk formed from a plurality of layers of copper conductor segments and insulation means as described in detail in the above mentioned copending application. In the preferred embodiment, each of the conductor segments has a substantially identical pattern and each conductor segment in each layer is identical. The ends of the conductor segments in the different layers are connected together to form a continuous wave winding. Portions of the conductor segments on one outer face of the armature also serve as commutator bars. Although the disk-type armature disclosed in the above mentioned copending application is preferred because of its remarkably high torque output, certain features of the present invention are adaptable for use with other types of electric motors utilizing other types of armature construction.

As shown, the armature 19 is in the form of an annulus and fixed to the outer side of the armature adjacent the central hole thereof is a spider 31 of non-conductive material, which is suitably reinforced by webs 32. Suitably fixed to the central portion of the spider 31 is a worm shaft 33, which rotates with the armature. The shaft 33 is mounted for rotation in bearings carried by a bracket or boss 34 and at the upper end of the shaft 33 is a worm gear 35 (FIGURE 2). The shaft 33 extends freely through a hole 36 in the regulator plate 27 into a housing 37, which may constitute a die casting and has as an integral part thereof the bearing boss 34. Fasteners 30 rigidly secure together the cover plate 28, the regulator plate 27 and the housing 37. In the housing 37 are integral socket members 38 for the brushes 20 and in each socket member 38 is a rubber insulating cup 39 in which is disposed an electrical conductive sleeve 40 in which the respective brush 20 is slidable. Holes 41 in the regulator plate 27 enables the brushes to extend therethrough into engagement with the armature 19.

Formed on the inner or plate end of the regulator arm 16 is an inwardly extending circular embossure 42 which bears against the flat outer face of the housing 37. The embossure 42 is formed with a circular hole 43, the edge portion of which rotatably engages a circular boss 44 projecting from the housing 37. A dished sheet metal retainer plate 45 overlaps the free edge portion of the embossure 42 for holding it in place and a series of fasteners 46 secure the plate 45 to the housing 37.

Returning to the description of the driving connection between the electric motor and the regulator mechanism, a worm wheel 47 meshes with the worm 35 and is driven thereby. The worm wheel 47 is fixed for rotation to one end of a torsion shaft 48, which extends through the housing 37 in a direction longitudinally of the regulator arm 17. At one end portion of the torsion shaft 48 is a bushing 49 and at the opposite end is a flanged bushing 50, on the outer end of which is fixed a bevel gear 51. At the outer end of the gear 51 the shaft 48 rotates in a bearing plate 52 which is secured by bolts 53 to the housing 37. As shown, a hole 54 is provided in the regulator arm 17 to accommodate a portion of the bevel gear 51 and the plate 52. The bevel gear 51 meshes with a gear sector 55, which is secured by fasteners 56 to the plate end portion of the regulator arm 16.

As diagrammatically shown on FIGURE 1, one of the regulator arms has a fixed pivotal mounting and, as indicated on FIGURES 3 and 4, the plate end of the regulator arm 16 is pivotally connected to the inner door panel P. For this purpose a bolt 57 extends through the wall of the arm 16 and through a hole in the door panel P to receive a nut 60. Interposed between the panel P and the outer face of the housing 37 are interfitting washers 58 and 59 which effect proper spacing between the housing 37 and the panel P and enable the regulator arm 16 and associated parts to rock thereon relatively to the door panel.

The plate end 27 of the regulator arm 17, as above indicated, is connected to the door panel by a link or strap 15 and for this purpose a bolt 61, at the end of the housing opposite to the connection between the regulator arm 16 and door panel, has a reduced neck 62 which projects through a hole in the end of the strap 15 enabling the pivotal movement thereof. The strap 15 is held in position by a wire clip 64 interposed between the strap and the head of the bolt and the opposite end of the strap is suitably pivoted to the door panel.

From the above it will be understood that rotation of the armature disk 19 imparts through the spider 31 rotation to the worm shaft 33. The worm 35 on the shaft 33 drives the worm wheel 47, imparting turning movements to the torsion shaft 48. Rotation of the bevel gear 51 on the shaft 48 drives the gear sector 55 in one direction or the other depending upon the direction of the rotation of the motor. Since the end portions of the regulator arms 16 and 17 are pivotally connected either directly or through the strap 15 to a fixed support, such as the inner door panel P, relative movement of the arms in one direction or the other is effective to raise or lower the window panel 10.

In the brush assembly shown on FIGURE 5, instead of employing a helical coil spring, a leaf spring 66 may be used. The spring 66 may be of phosphor bronze and in addition to biasing the brush 67, it serves also to transmit electrical current from the lead 68. In this connection the rubber bushing 69 has a slot to receive the spring and the sleeve 70 in which the brush slides is also longitudinally slotted. Thus it will be understood that the leaf spring 66 not only imposes resilient pressure upon the brush but also carries current to the brush.

An alternate means of connecting the strap 15 to the actuator body is shown on FIGURE 6 in which a plate 71 is fixed as by welding to a part of the actuator, such as the motor cover plate 28. The plate has a pair of spaced parallel reversely bent edge portions 72 which form channels to receive offset flanges 73 on a plate 74 bolted or otherwise secured to an end of the strap 15. The edge of each flange 73 is curved to enable the plate 74 to have limited rocking movement relative to the plate 71. In the event that the fastener plate 71 is fixed to the motor cover plate 28, it is appropriate that a stud or similar fastener be also mounted on the same for fixed pivotal connection with the inner door panel P.

In the alternate form of gear drive shown in FIGURE 7, the parts corresponding to those above described are given the same reference number plus the exponent $a$. As shown the armature disk 19a has a central spider 31a which is fixed for rotation to a pinion gear 75 mounted for rotary movement upon a shaft 76 carried respectively by the motor cover plate 28a and the housing 37a. The pinion gear 75 meshes with a relatively large gear 77 which rotates with a pinion gear 78 rotatable upon a shaft 78' mounted at its ends in the regulator arm 17a and the housing 37a respectively. The gear 77 is coupled to the pinion gear 78 through a conventional clutch arrangement, generally indicated by reference numeral C which effectively eliminates any retrograde movement of the gears. The pinion gear 78 meshes with a large gear 79 which rotates with a smaller gear 80 having bearing on the shaft 76. The smaller gear 80 meshes with the gear sector 55a for effecting swinging movement of the arm to which the sector is fastened (corresponding to the arm 16 above described). Thus through a train of gears suitable speed reduction can be achieved to cause the regulator arms to swing toward and away from each other in a predetermined manner.

While several different gearing arrangements have been specifically illustrated and described, other gearing systems may be satisfactorily employed. Among the other types of gearing systems which could be employed without departing from the spirit of the invention would be a planetary gearing arrangement.

It will be appreciated that the torsion shaft 48 is designed to reduce impact forces on the entire gear system when the associated window assembly is caused to reach one or the other of its limits of travel. Manifestly, through such a reduction in the impact forces which would otherwise be present in the gear system, the longevity of the life of the various gears is lengthened substantially.

Among the advantages of the above described invention, it will be apparent that since the gears are positioned within one die cast housing, the possibility of error in the appropriate meshing and alignment of the gears is substantially reduced as might occur in the event the gears were disposed in a plurality of mating housings.

Further, the use of the particular die cast housing arrangement may be readily and easily sealed to provide a water-tight assembly to militate against the deleterious effects of moisture penetration on the system.

According to the provisions of the patent statutes, we have explained the principles and mode of operation of our invention, and have illustrated and described what we now consider to represent its best embodiment. However, we desire to have it understood that, within the scope of the appended claims, the invention may be practiced otherwise than as specifically illustrated and described.

What is claimed is:

1. A self contained actuator for a vehicle window or the like in a confined relatively inaccessible area such as within a vehicle door comprising a pair of relatively swingable arms the outer ends of which are rockable toward and away from each other, a relatively flat generally cup-shaped housing having relatively pivotal movements on the inner end portion of one arm, the inner end of the other arm extending across the open side of said housing and fixedly engaging same at one side, a dished cover plate fixed to the other side of said other arm, electric motor means within said cover plate and including an armature disk and stator means formed in part by said cover plate and disposed in axial spaced relationship to said disk armature, and gear reduction means including a gear fixed to the axis of said armature disk, bearing means for said gear carried by said housing and cover plate respectively, said gear reduction means being arranged within the space between said housing and said other arm for establishing a driving connection between said disk armature and said arms.

2. The organization claimed in claim 1, in which said disk carried gear comprises a worm gear rotatable with said armature disk, said gear reduction means further including a worm wheel meshing with said worm gear, a torsion shaft disposed at right angles to the axis of said armature disk and carrying said worm wheel at one end thereof, a bevel gear at the opposite end of said torsion shaft, and a gear sector in mesh with said bevel gear and fixed to the inner end portion of said one arm.

3. The organization as claimed in claim 1 in which the gear reduction means comprises a train of gears leading from said disk carried gear, a clutch interposed in said gear train for militating against retrograde movement thereof, and a gear sector fixed to the inner end portion of said one arm and operatively connected to said train of gears to effect actuation of said gear sector in response to rotation of said armature disk.

References Cited

UNITED STATES PATENTS

| | | | |
|---|---|---|---|
| 3,359,684 | 12/1967 | Tinder | 49—349 |
| 3,373,528 | 3/1968 | Tinder et al. | 49—349 |
| 1,720,063 | 7/1929 | Serste | 49—351 |
| 2,304,245 | 12/1942 | Dorries | 49—349 X |
| 3,182,525 | 5/1965 | Tinder et al. | 74—640 |
| 3,211,262 | 10/1965 | Hoffstrom | 74—640 |
| 3,280,353 | 10/1966 | Haydon et al. | 310—154 |

DAVID J. WILLIAMOWSKY, Primary Examiner.

J. KARL BELL, Assistant Examiner.

U.S. Cl. X.R.

74—640